United States Patent
Hayden

(10) Patent No.: US 10,051,300 B1
(45) Date of Patent: Aug. 14, 2018

(54) MULTIMEDIA PROGRESS TRACKER

(75) Inventor: Andrew Hayden, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 515 days.

(21) Appl. No.: 13/358,610

(22) Filed: Jan. 26, 2012

(51) Int. Cl.
*H04L 29/06* (2006.01)
*H04N 21/262* (2011.01)
*H04N 21/8547* (2011.01)

(52) U.S. Cl.
CPC ..... *H04N 21/26258* (2013.01); *H04L 65/607* (2013.01); *H04N 21/8547* (2013.01)

(58) Field of Classification Search
CPC .............. H04L 29/08072; H04L 29/06; H04L 29/0809
See application file for complete search history.

(56) References Cited

U.S. PATENT DOCUMENTS

| | | | | |
|---|---|---|---|---|
| 6,584,498 B2* | 6/2003 | Nguyen | ............ | G06F 17/30902 707/E17.12 |
| 8,090,718 B2* | 1/2012 | Xu | ............ | G06F 17/30017 707/736 |
| 8,429,516 B1* | 4/2013 | Riggs | ............ | G06F 21/6254 715/201 |
| 8,548,419 B1* | 10/2013 | Sennett et al. | ............ | 455/404.1 |
| 8,990,692 B2* | 3/2015 | Chelba | ............ | H04N 5/44591 715/719 |
| 9,049,472 B2* | 6/2015 | Rijkom | ............ | H04N 21/4325 |
| 9,292,081 B2* | 3/2016 | Riggs | ............ | G06F 3/048 |
| 2004/0139474 A1* | 7/2004 | Carro | ............ | 725/112 |
| 2006/0168510 A1* | 7/2006 | Bryar et al. | ............ | 715/511 |
| 2007/0118801 A1* | 5/2007 | Harshbarger et al. | ........ | 715/730 |
| 2007/0198654 A1* | 8/2007 | Matsuoka | ........... | H04L 43/0811 709/217 |
| 2008/0033806 A1* | 2/2008 | Howe | ............ | G06Q 30/02 705/14.54 |
| 2008/0141307 A1* | 6/2008 | Whitehead | ............ | H04N 7/173 725/46 |
| 2009/0047000 A1* | 2/2009 | Walikis et al. | ............ | 386/124 |
| 2009/0271873 A1* | 10/2009 | Ram et al. | ............ | 726/29 |
| 2010/0122189 A1* | 5/2010 | Kenagy | ............ | H04L 65/604 715/764 |
| 2010/0131527 A1* | 5/2010 | Wohlert | ............ | 707/758 |
| 2011/0053689 A1* | 3/2011 | Cohen | ............ | 463/31 |
| 2011/0238660 A1* | 9/2011 | Riggs | ............ | 707/726 |
| 2011/0246657 A1* | 10/2011 | Glow | ............ | H04L 65/1063 709/231 |
| 2011/0302510 A1* | 12/2011 | Harrison et al. | ............ | 715/760 |
| 2012/0011550 A1* | 1/2012 | Holland | ............ | 725/78 |
| 2012/0084644 A1* | 4/2012 | Robert et al. | ............ | 715/255 |

(Continued)

*Primary Examiner* — Abdullahi E Salad

(74) *Attorney, Agent, or Firm* — Thomas | Horstemeyer, LLP

(57) ABSTRACT

Disclosed are various embodiments for an application that tracks the progress of presentation of network content. The application facilitates storing, in a memory accessible to at least one computing device, at least one universal resource locator for facilitating access to multimedia network content. The application also stores, in the memory, a time marker associated with a progress of a presentation of the multimedia network content. Furthermore, the application links, in the at least one computing device, the time marker to at least one universal resource locator for resuming the presentation of the multimedia network content at a last point of progress.

20 Claims, 5 Drawing Sheets

(56) References Cited

U.S. PATENT DOCUMENTS

2012/0275764 A1* 11/2012 Eyer .................. H04N 21/8133
                                                    386/241
2013/0007101 A1* 1/2013 Trahan et al. ................ 709/203
2013/0031162 A1* 1/2013 Willis et al. .................. 709/203

* cited by examiner

MULTIMEDIA PROGRESS TRACKER

BACKGROUND

Users may access large amounts of network content over the internet. Network content may by addressable by a network address. If a user wishes to access a variety of network content, then the user will need to use more network addresses.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Multimedia network content, such as TV shows, movies, songs, audio records, or any other multimedia content may be presented to users over a network. Moreover, the presentation of the multimedia content may be streamed to a user of the course of many tracks or sequential episodes. To access streaming multimedia, users use a network address identifier such as a universal resource locator (URL). As a host multimedia player facilitates the presentation of the multimedia network content to the user, the progress of the presentation may be tracked by the host multimedia player. This progress of the presentation may be linked to the URL to allow a user to easily resume the presentation of the network content. As a result, a user merely needs to use one URL for accessing and resuming playback of his or her multimedia content.

In the following discussion, a general description of the system and its components is provided, followed by a discussion of the operation of the same.

Figure 1:
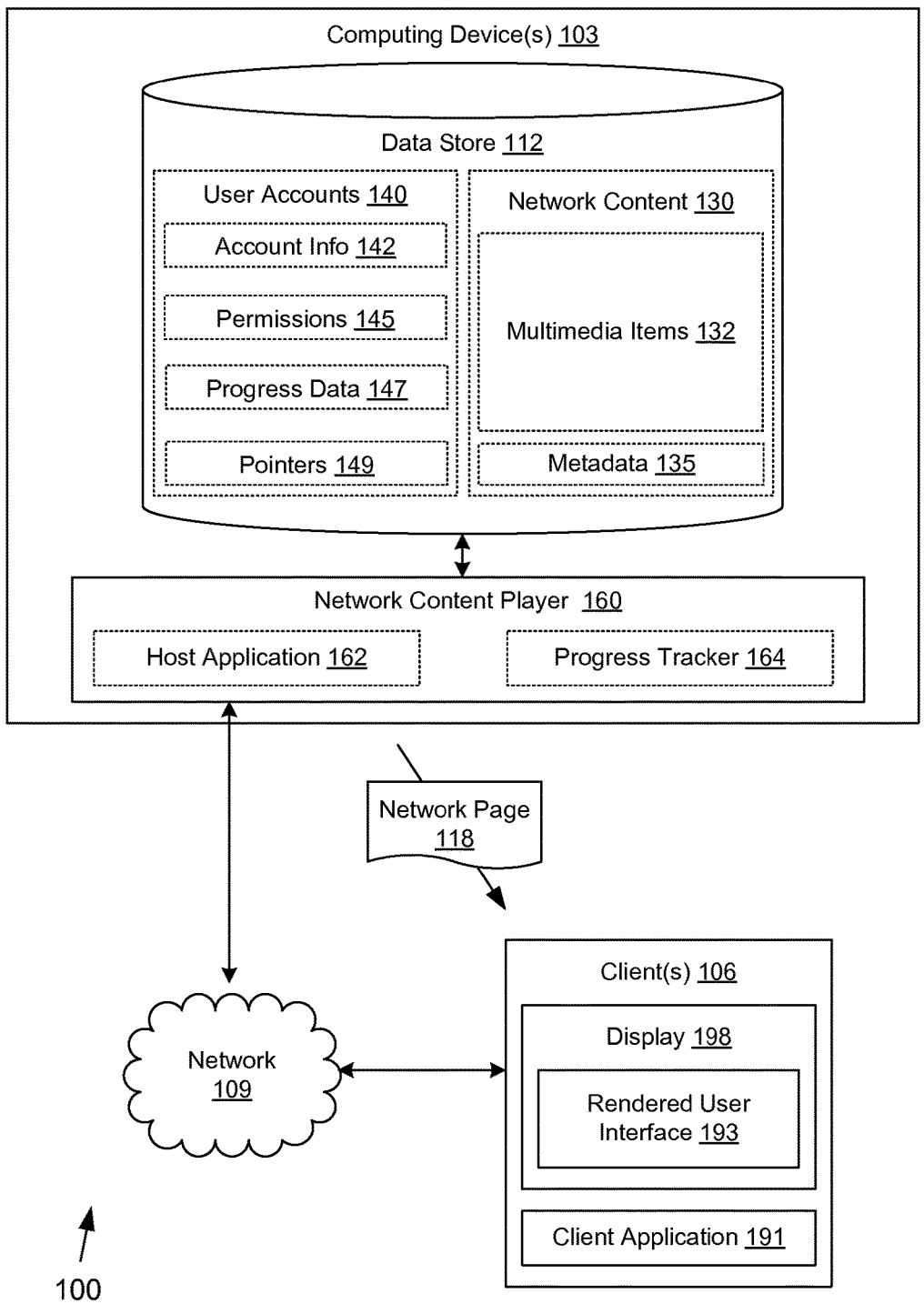
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below. The components executed on the computing device 103, for example, include a network content player 160 and other applications, services, processes, systems, engines, or functionality not discussed in detail herein.

The network content player 160 is executed to facilitate the presentation of network content to one or more users. The network content player 160 is configured to generate and encode a network page 118 for display and presentation to a user. In one embodiment, the network content player 160 streams multimedia to different users. The network content player 160 comprises a host application 162 and a progress tracker 164. The host application 162 encodes network content for display and presentation to users. The progress tracker 164 tracks user activity as users access the network content. The progress tracker 164 is responsible for linking a progress of presentation of particular network content to a network address identifier that provides access to the particular network content.

The data stored in the data store 112 includes, for example, user accounts 140, network content 130, and potentially other data. A user may have one or more user accounts 140 for accessing network content 130. For example, a user may subscribe to a service that provides network content 130 for the user. In turn, a user account 140 is created for the user. A user account 140 comprises account information 142, permissions 145, progress data 147, and pointers 149. The account information 142 may include settings, preferences, profiles, or any other information that characterizes the user account 140. In one embodiment, a user account 140 requires a login and password for access to a network content service. Thus, these details are stored as account information 142.

A user account 140 also includes permissions 145 for tracking what network content 130 a user may or may not access. Additionally, the user account 140 includes progress data 147 for recording the status of presentation of the network content to the user. The user account 140 also includes pointers 149 for associating network content items to a particular user. Pointers 149 connect network address identifiers such as universal resource locators (URLs) to network content items.

Network content 130 includes multimedia items 132 and metadata 135 that is associated with the multimedia items 132. The network content 130 encompasses any type of network content, such as multimedia items 132, that is offered for presentation to users. Multimedia items 132 may comprise a multitude of video, audio, or any other multimedia items 132. Users may have access to at least a portion of the available multimedia items 132 stored as network content 130. Metadata 135 may be associated with one multimedia item 132 or a series of multimedia items 132. Metadata 135 may comprise information relating to an order of presenting a series of multimedia items 132 in a particular sequence. Additionally, metadata 135 may comprise information for a particular multimedia item 132, such as title, author, track, episode, season, volume, length in time, compression format, data size, or any other multimedia item information.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 106 may include a display 198. The display 198 may comprise, for example, one or more devices such as cathode ray tubes (CRTs), liquid crystal display (LCD) screens, gas plasma-based flat panel displays, LCD projectors, or other types of display devices, etc. A rendered user interface 193 may be presented in the display 198.

The client 106 may be configured to execute various applications such as a client application 191 and/or other applications. The client application 191 may be executed in a client 106 for example, to access and render network pages, such as web pages, or other network content served up by the computing device 103 and/or other servers. The client application 191, for example, may be email applications, instant message applications, browser applications, and/or other applications. A client application may facilitate receiving a network page 118 encoded by the network content player 160 and rendering the network page 118 for display and presentation to a user.

Next, a general description of the operation of the various components of the networked environment 100 is provided. To begin, a user may use a client 106 for communicating with the network content player 160 by way of a network 109. The network content player 160 is configured to generate, encode, and transmit one or more network pages 118 to a client 106. The network page 118 includes a user interface for allowing a user to interact with the network content player 160. A user using a client 106 may render the user interface in the display of the client 106.

In one embodiment, a user who wishes to access network content logs into his or user account 140 before the network content player 160 presents the network content to the user. In this case, the user must first submit his or her credentials to the network content player 160. In another embodiment, a client application 191 employs a scheme for trusting the network content player 160 based on certificate authorities, server certificates, or any other certificate. According to the certificate, the client and the network content player 160 engage in authenticated communication. This allows a user to access network content using a network address identifier without having to log into the system of the network content player 160.

The network content player 160 allows the user to access the network content items by using a network address identifier such as a universal resource locator (URL). For a user, each network content item corresponds to one or more URLs. In one embodiment, network content items are multimedia items 132 stored in a multimedia library. Multimedia items 132 may be video and/or audio files for presentation to a user. Thus, to access a specific video, a user can use a corresponding URL to locate the video and initiate the services of the network content player 160.

For example, the network content player 160 is a multimedia server that is responsible for provisioning multimedia for presentation to a user. In other words, the network content player 160 employs the functionality of a host application 162 for playing out multiple multimedia streams to many different users. The network content player 160 is configured to access multimedia items 132 and play the multimedia items 132 for users.

The network content player 160 is further configured to manage a user account 140 for the user. In one embodiment, the network content player 160 grants the user access to all multimedia items 132. In another embodiment, the network content player 160 requires the user to subscribe or otherwise obtain a license to access a particular multimedia item 132. In this case, the permissions 145 of a user account will reflect what multimedia items 132 a particular user can access.

For each multimedia item 132 or series of multimedia items 132 a corresponding pointer 149 is stored in a user account 140. A series of multimedia items, for example, may be a series of sequential video episodes. Pointers 149 associate network address identifiers, such as URLs, to multimedia items 132. The network content player 160 generates and sends to the user URLs for accessing multimedia items 132. When a user uses a URL in a client 106, the URL corresponds to a pointer 149. The pointer 149 is associated with a multimedia item or a series of multimedia items. Thus, for each user, the pointer 149 links the URL of a particular multimedia item 132 to the particular multimedia item.

To elaborate further, the network content player 160 may generate one or more URLs for providing a user access to a multimedia item 132 or a series of multimedia items 132. Regardless of the values of the one or more URLs, the one or more URLs are each associated with the same pointer 149. Accordingly, regardless of the URL the user uses, the pointer 149 ultimately locates the multimedia item 132 for display and presentation to the user. In one embodiment, the pointer 149 is a normalized URL or a canonical URL. Alternatively, the pointer 149 may be a list of equivalent URLs. Hence, all equivalent URLs address the same multimedia item 132 or series of multimedia items 132.

Once the network content player 160 generates and sends one or more URLs to the client 106, a user can use the one or more URLs to access a multimedia item 132 or series of multimedia items 132. The network content player 160 employs the services of the host application 162 to encode the multimedia content for presentation to the user. The encoded content is transmitted over a network 109 for reception at a client 106. In one embodiment, progress data 147 is updated as the network content 130 is presented to the user. That is to say, the progress of the presentation to the user is stored as progress data 147. For a multimedia item 132, this may be a time marker that indicates where the user is in terms of time with regard to the presentation of the multimedia. Additionally, a progress of presentation may include an episode identifier, volume identifier, season identifier, or series identifier if the user has accessed a series of multimedia items 132.

In another embodiment, the user may indicate to the network content player 160 that the user wishes to store his or her progress of presentation of a multimedia item 132 or series of multimedia items 132. In this case, the progress tracker 164 receives an indication to do so and then updates the progress data 147 accordingly.

The network content player 160 is further configured to link the progress of presentation to one or more network address identifiers. For example, the network content player 160 can achieve this by linking the progress of presentation to a corresponding pointer 149. Thus, when a user uses a URL, the URL is associated with a pointer 149 and that pointer 149 is linked to a progress of presentation of the multimedia item 132 addressed by the URL. Thus, when the network content player 160 serves the multimedia item 132 to the user, the network content player 160 can resume presentation based on the linked progress of presentation.

From the perspective of the user, the user may use a URL generated by the network content player 160 or any equivalent URL thereof and resume playback of the multimedia item. The equivalent URLs are all associated with the same pointer 149, the pointer 149 references a multimedia item or a series of multimedia items, and the pointer 149 is further linked to a progress of presentation stored as progress data 147. Therefore, one network address identifier, such as a URL, may be used by a user, where the networked address identifier is linked to the progress the user has made in regard to playback of multimedia.

Figure 2:
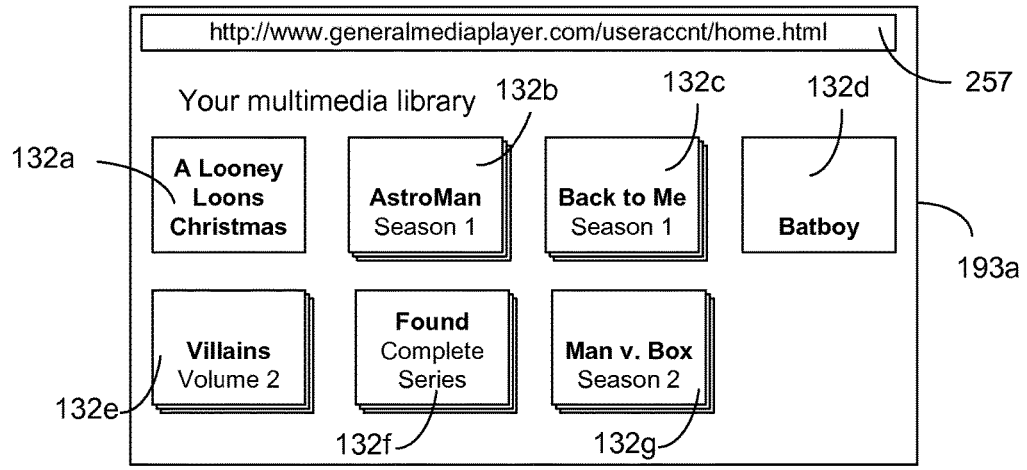
FIGS. 2-3 are drawings of examples of user interfaces rendered by a client in the networked environment of FIG. 1 according to various embodiments of the present disclosure.

Referring next to FIG. 2, shown is a drawing of an example of a user interface rendered by a client in the networked environment of FIG. 1 according to various embodiments of the present disclosure. Specifically, FIG. 2 provides one example of a rendered user interface 193a within a network page 118 (FIG. 1) sent by a network content player 160 (FIG. 1). As seen in FIG. 2, the rendered user interface 193a is a menu for facilitating a selection of network content 130 (FIG. 1) for presentation to a user. The network content 130 comprises a plurality of multimedia items 132a-g. The user may access the user interface by using a URL 257. In one embodiment, the user must login by providing credentials such as a user name and password. In another embodiment, a user can access the user interface by using a certificate of authentication that is associated with the URL 257.

In one embodiment, each multimedia item 132a-g includes information for identifying the multimedia item 132a-g. For example, the information may be a title, a series, a volume, a season, or any other information. Furthermore, this information may be metadata 135 (FIG. 1) associated with each multimedia item 132a-g. Some multimedia items 132a and 132d comprise individual multimedia items. Individual multimedia items can be individual video episodes or individual audio tracks available to a user for access. Alternatively, some multimedia items 132b, 132c, 132e, and 132g may comprise a series of individual multimedia items. For example, a series of multimedia items is a series of individual video episodes or a season of individual video episodes. In one embodiment, each individual multimedia item within a series is sequentially ordered. In this case, a user may desire a playback of the series of multimedia items in the sequential order.

A user may be granted access to facilitate a playback of the network content 130 displayed in the rendered user interface 193a. The multimedia items 132a-g may represent a subset of all multimedia items 132 (FIG. 1) stored as network content 130. In this case, a user is granted various permissions 145 (FIG. 1) to access the multimedia items 132a-g. Thus, the rendered user interface 193a represents at least some multimedia items 132 to which the user is granted access.

The network content player 160 is configured to generate and encode the user interface depicted in FIG. 2 for facilitating a presentation of multimedia items at a client 106 (FIG. 1). The network content player may include multimedia items 132a-g for facilitating a selecting of a multimedia item for playback at the client. For each multimedia item 132a-g displayed to the user, the network content player 160 may generate one or more network address identifiers such as URLs. For each of the one or more network address identifiers associated with a particular multimedia item 132a and 132d or series of multimedia items 132b, 132c, 132e, and 132g, the one or more network address identifiers are associated with a pointer 149 (FIG. 1). Accordingly, for each multimedia item 132a and 132d or series of multimedia items 132b, 132c, 132e, and 132g, there exists one corresponding pointer 149.

For example, the series of multimedia items 132g may be a multimedia series titled "Man v. Box." This series of multimedia items 132g comprises a plurality of sequentially ordered multimedia episodes that make up a series. A user who watches the "Man v. Box" series may desire to watch the series in sequence by a sequentially ordered episode number. For the series of multimedia items 132g, the network content player 160 may generate one or more network address identifiers for facilitating access and playback of the series of multimedia items 132g. In one embodiment, the one or more network address identifiers comprise one or more equivalent URLs. Equivalent URLs may be different in value, but they all address the same network content. In other words, regardless of which equivalent URL a user uses, the user accesses the same series of multimedia items 132.

Furthermore, each of the equivalent URLs is associated with the same pointer 149. To this end, the series of multimedia items 132g referring to "Man v. Box—season 2" has a corresponding pointer 149, where this pointer 149 is associated with one or more equivalent network address identifiers, such as URLs. Moreover, even though the series of multimedia items 132g comprises a plurality of individual multimedia items, such as, for example, individual episodes of "Man v. Box," a single pointer 149 may be associated with the entire series of multimedia items 132g. Consequently, a user may use any of the one or more equivalent URLs to access the series of multimedia items 132g, such as, for example, the entire season 2 of "Man v. Box" rather than accessing individual episodes of the season.

Similarly, an individual multimedia item 132d such as "Batboy" may be associated with one pointer 149. The network content player 160 may generate one or more "Batboy" URLs for facilitating playback of "Batboy" at the client 106. Regardless of which "Batboy" URL a user uses, the same "Batboy" multimedia item 132d is to be accessed for playback.

In one embodiment, the user may click on or otherwise select any of the presented multimedia items 132a-g. The network content player 160 generates at least one network address identifier, such as a URL, corresponding to each of the multimedia items 132a-g. By selecting the box representing a multimedia item 132a-g, the user uses the corresponding network address identifier for accessing the multimedia item 132a-g represented by the box. For example, clicking on the box represented by the multimedia item 132g navigates the user to a user interface of FIG. 3.

Figure 3:
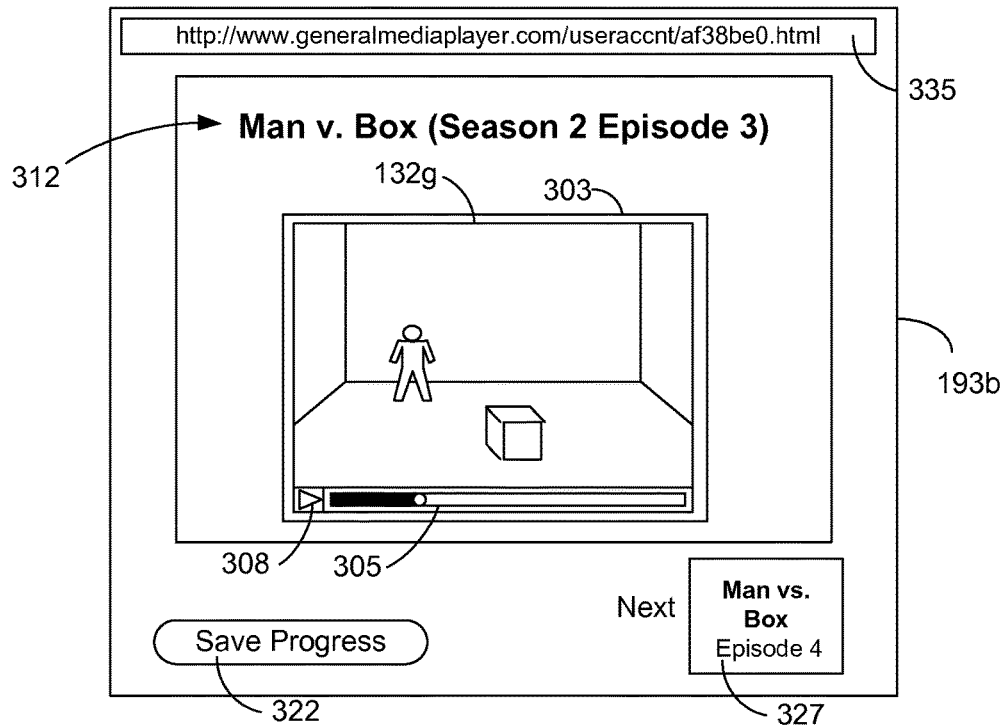

Turning now to FIG. 3, shown is a drawing of an example of a user interface rendered by a client in the networked environment of FIG. 1 according to various embodiments of the present disclosure. Specifically, FIG. 3 provides one example of a rendered user interface 193b within a network page 118 (FIG. 1) sent by a network content player 160 (FIG. 1). As seen in FIG. 3, the rendered user interface 193b facilitates playing the network content 130 (FIG. 1) for presentation to a user.

The rendered user interface 193b includes a network address identifier 335 for facilitating access to the network content 130. The rendered user interface 193b further includes a content identifier 312 and a display window 303 for displaying network content 130 such as a multimedia item 132 (FIG. 1). The content identifier 312 provides information, such as title, artist, season, episode, volume, or series information relating to network content subject to being presented in the display window 303.

The user interface of FIG. 3 also includes one or more controls 308 for facilitating the playback of the network content 130. For example, controls 308 may be a play button, stop button, pause button, fast-forward button, rewind button, or any combination thereof. Additionally the user interface may further include a slider 305 for representing the progress of display of the network content 130. In one embodiment, the slider 305 automatically translates in a progression that corresponds to the automatic playback of the network content 130. In another embodiment, the slider 305 is an interactive slider 305 that allows a user to manipulate the position of the slider 305. In this embodiment, manipulation of the interactive slider 305 controls the time indexing of the playback of the network content 130.

The user interface further includes a save progress button 322 for allowing the user to record his or her progress in regard to the presentation of the network content. In one embodiment, the save progress button appears to the user when the user exits or navigates away from a network page that presents the user interface. Additionally, the rendered user interface 193b includes a series interface 327. In one embodiment, the series interface 327 displays information to the user regarding multimedia items included in a series of multimedia items that a user is currently being presented to a user. For example, information about a next episode within a series of episodes may be displayed in the series interface 327. In another embodiment, the series interface 327 is interactive and allows a user to navigate throughout a series of multimedia items 132.

In one embodiment, the user interface of FIG. 3 is accessed by using the user interface of FIG. 2, where a user clicks on the box representing "Man v. Box—season 2" for accessing the series of multimedia items 132g. In another embodiment, a user uses a network address identifier 335 to access the "Man v. Box—season 2" multimedia item 132g. For example, the user can use a URL in association with a client application 191 (FIG. 1), such as, for example, a web browser, or any dedicated client application.

Thus, the rendered user interface 193b of FIG. 3 is presented to the user in response to a network address identifier 335 generated by a network content player 160. In the example of FIG. 3, one multimedia item or a series of multimedia items 132g is presented to the user. For example, the third episode, among a series of sequential episodes, is subject to playback at a client 106 (FIG. 1). A host application 162 (FIG. 1) of the network content player 160 streams or otherwise encodes for display a multimedia item 132g selected by a user using the network address identifier 335 that corresponds to the multimedia item 132g.

In one embodiment, the multimedia item 132g subject to presentation automatically progresses over time. In other words, the multimedia item 132g is played to the user. This may be the case with audio or video items. In another embodiment the multimedia item 132g is a sequentially ordered episode among a series of multimedia items 132g. When a particular episode completes playback to a user, the next episode in the series is automatically presented to the user. For example, if the network content player 160 completes the presentation of the "Man v. Box" season 2, episode 3 multimedia item 132g, then the network content player 160 may automatically begin presenting the "Man v. Box" season 2, episode 4 multimedia item 132g.

The user may record the progress of presentation of a multimedia item or a series of multimedia items 132g by clicking on the save progress button 322. In this example, progress data 147 (FIG. 1) associated with presentation of season 2 of "Man v. Box" is recorded as progress data 147 in association with the user account 140 (FIG. 1) of the user. Progress data 147 may be stored based on the presentation of an individual multimedia item 132 or the presentation of a series of multimedia items 132. Furthermore, a time marker that correlates to the position of the slider 305 may be included as progress data 147.

Figure 4:
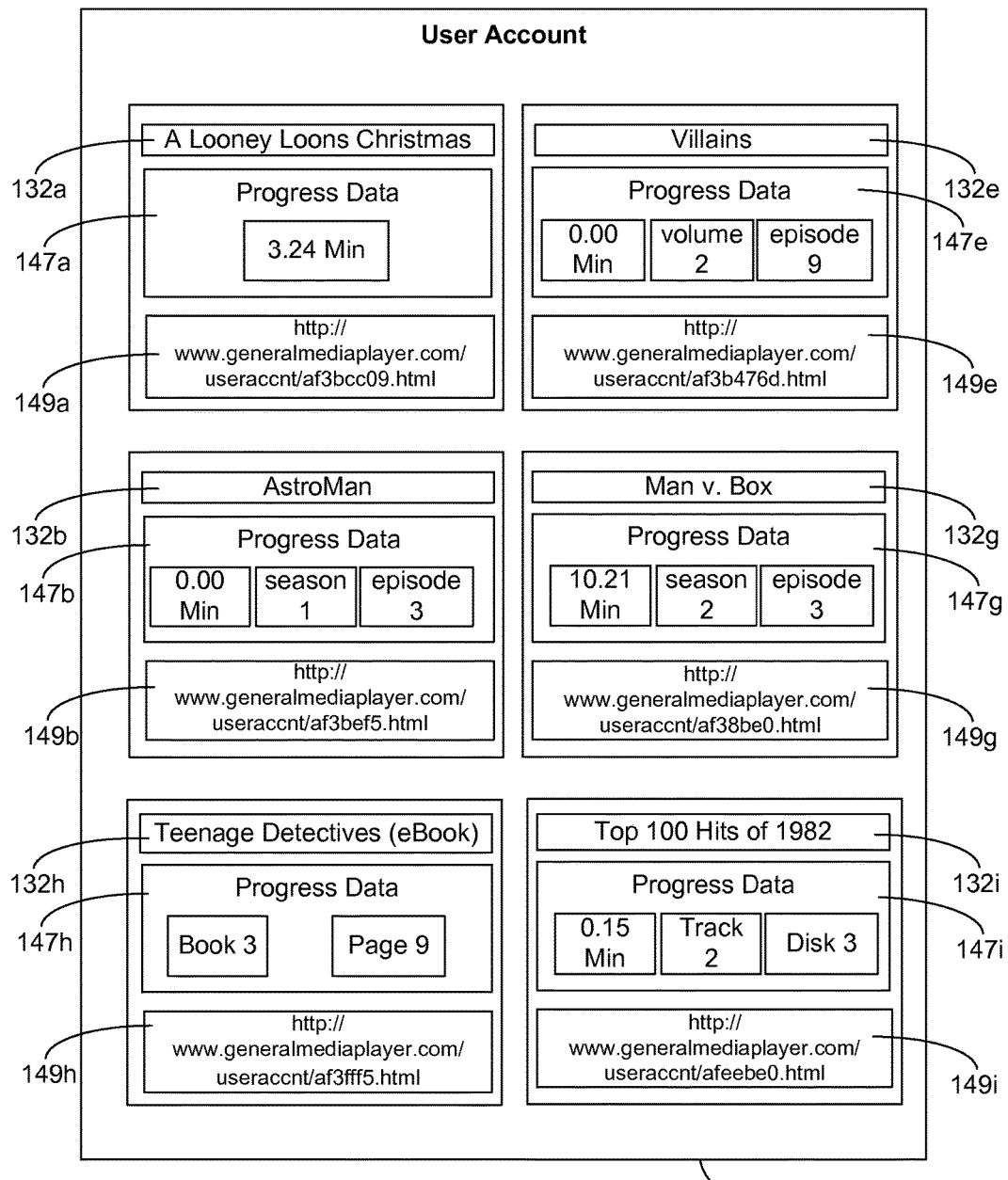
FIG. 4 is a drawing of an example of data stored in the networked environment of FIG. 1 according to various embodiments of the present disclosure.

Moving on to FIG. 4, shown is a drawing of an example of data stored in the networked environment of FIG. 1 according to various embodiments of the present disclosure. Specifically, FIG. 4 represents the structure and content of an exemplary user account 140a. The user account 140a includes one or more multimedia items 132a, 132b, 132e, 132g, 132h, 132i that a user may access for presentation. Each multimedia items 132a, 132b, 132e, 132g, 132h, 132i corresponds respectively to progress data 147a, 147b, 147e, 147g, 147h, 147i and pointer data 149a, 149b, 149e, 149g, 149h, 149i.

For example, the user account 140a indicates that the user has access to "Man v. Box—season 2" 132g which comprises a series of sequentially ordered multimedia episodes. The progress data 147g associated with the "Man v. Box—season 2" multimedia series 132g indicates that the user is currently at 10.21 minutes into episode 3 of the season into the presentation of the "Man v. Box—season 2" series. In one embodiment, a progress tracker 164 (FIG. 1) automatically tracks the progress of presentation of each multimedia item or each series of multimedia items. The progress is then stored as progress data 147 for each multimedia item or each series of multimedia items. In an alternative embodiment, the progress tracker 164 responds to an input from the user to store the progress of presentation of network content 130 (FIG. 1).

The progress tracker 164 obtains time marker data based on where the presentation of network content 130 is in terms of time and stores it as progress data 147. Additionally the progress tracker 164 may obtain a season identifier, series identifier, volume identifier, episode identifier, any other identifier for determining the progress of presentation of a series of multimedia items 132 in terms of a sequential order in the series of multimedia items 132.

FIG. 4 also depicts an example of the manner in which a pointer 149 is associated with a multimedia item 132 or a series of multimedia items 132. A pointer 149, for example, may be a network address identifier, such as a URL. Additionally, the pointer 149 may be any identifier that is associated with one or more equivalent URLs. In this example, the pointer 149 is a canonical URL that normalizes a plurality of URLs for treating the plurality of URLs as functionally equivalent. In another embodiment, the pointer 149 is a list of equivalent URLs that all access the same corresponding multimedia item 132 or series of multimedia items 132. Any URLs generated by the network content player 160 (FIG. 1) for providing access to a particular series of multimedia items 132 or individual multimedia item 132 is associated with a corresponding pointer 149. In another embodiment, the pointer 149 itself is a URL that is generated and sent to the user.

The progress tracker 164 links the progress data 147 to its corresponding pointer 149. Consequently, this allows a user to use the same network address identifier for accessing a particular multimedia item 132 or series of multimedia items 132 such that the network address identifier is effectively linked to the progress of presentation of the multimedia content. In other words, the progress of presentation of network content 130 is built into the URL for accessing the network content 130 for presentation. This allows a user to easily stop and resume playback of network content 130 while requiring the user to simply manage a single URL. Furthermore, a user can resume playback on different clients 106 (FIG. 1) as progress data 147 is stored remotely on a computing device 103 (FIG. 1).

Moreover, FIG. 4 provides additional examples of multimedia items 132. For example, an eBook multimedia series 132 may be a collection of various books presented as text in a digital format. An eBook is a digital book that may include text and/or images that is readable using a display 198 (FIG. 1). The eBook "Teenage Detectives" 132$h$ may be a series of sequential books where each book is divided by pages. Accordingly, corresponding progress data 147$h$ may indicate that a user who is reading "Teenage Detectives" is on page nine of the third book of the series. As another example, a multimedia item 132 may be an audio series. An audio series may be any sound, music, spoken word, or any combination thereof that is encoded in a digital format. In this example, the audio series titled "Top 100 hits of 1982" 132$i$ may include time markers, track numbers, volume numbers, disk numbers, or any other manner for quantifying a progress of presentation of an audio series. In the example of FIG. 4, a user may have listened to 0.15 minutes of track two of the third disk of "Top 100. Hits of 1982" 132$i$.

Figure 5A:
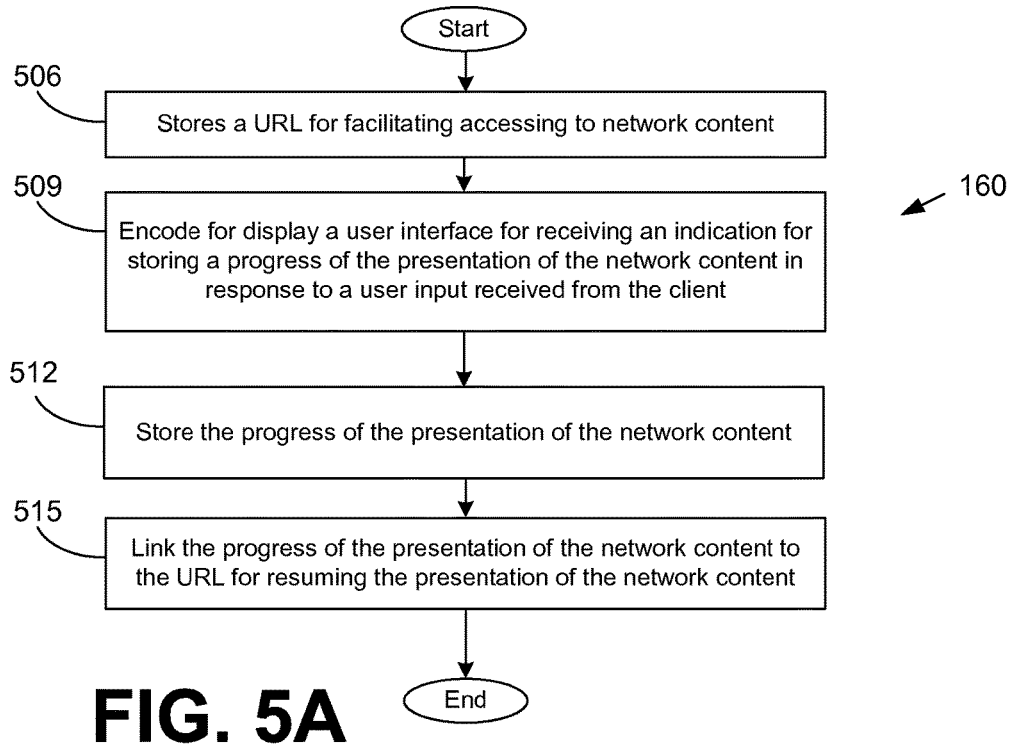
FIGS. 5A and 5B are flowcharts illustrating examples of functionality implemented as portions of a network content player executed in a computing device in the networked environment of FIG. 1 according to various embodiments of the present disclosure.

Referring next to FIG. 5A, shown is a flowchart that provides one example of the operation of a portion of the network content player 160 according to various embodiments. It is understood that the flowchart of FIG. 5A provides merely an example of the many different types of functional arrangements that may be employed to implement the operation of the portion of the network content player 160 as described herein. As an alternative, the flowchart of FIG. 5A may be viewed as depicting an example of steps of a method implemented in the computing device 103 (FIG. 1) according to one or more embodiments.

Beginning with box 506, the network content player 160 stores a URL for facilitating accessing particular network content 130 (FIG. 1). The network content player 160 may also send the URL to the user. Furthermore, in one embodiment, the network content player 160 associates the URL to a pointer 149 (FIG. 1), where the pointer 149 is further associated with the particular network content 130.

Next, in box 509, the network content player 160 encodes for display a user interface for receiving an indication for storing a progress of the presentation of the network content 130 in response to a user input received from a client. The progress of presentation may be updated by the user as the particular network content 130 is presented to the user over time. In box 512, the network content player 160 stores the progress of the presentation of the particular network content 130.

In box 515, the network content player 160 links the progress of the presentation of the particular network content 130 to the URL for resuming the presentation of the particular network content 130. In one embodiment, the network content player 160 uses a pointer 149 that is associated with the particular network content 130, the URL, and the progress of presentation data.

Figure 5B:
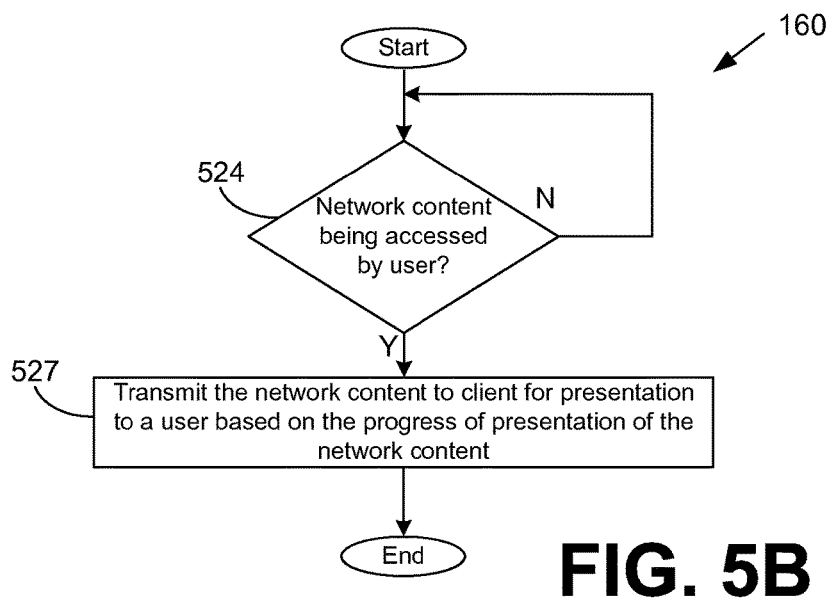

Referring next to FIG. 5B, shown is a flowchart that provides one example of the operation of a portion of the network content player 160 according to various embodiments. It is understood that the flowchart of FIG. 5B provides merely an example of the many different types of functional arrangements that may be employed to implement the operation of the portion of the network content player 160 as described herein. As an alternative, the flowchart of FIG. 5B may be viewed as depicting an example of steps of a method implemented in the computing device 103 (FIG. 1) according to one or more embodiments.

Beginning with box 524, the network content player 160 checks whether particular network content 130 (FIG. 1) is being accessed by a user. In box 527, when the particular network content 130 is accessed, the network content player 160 transmits the network content 130 to a client 106 (FIG. 1) for presentation to a user based on the progress of presentation of the network content 130. For example, a user may use a network address identifier, such as URL, to access the particular network content 130. The network content player 160 links the progress of presentation of the particular network content 130 to the URL. Consequently, this URL is a portable mechanism for resuming playback at a variety of clients 106 that is automatically associated with the progress of presentation.

Figure 6:
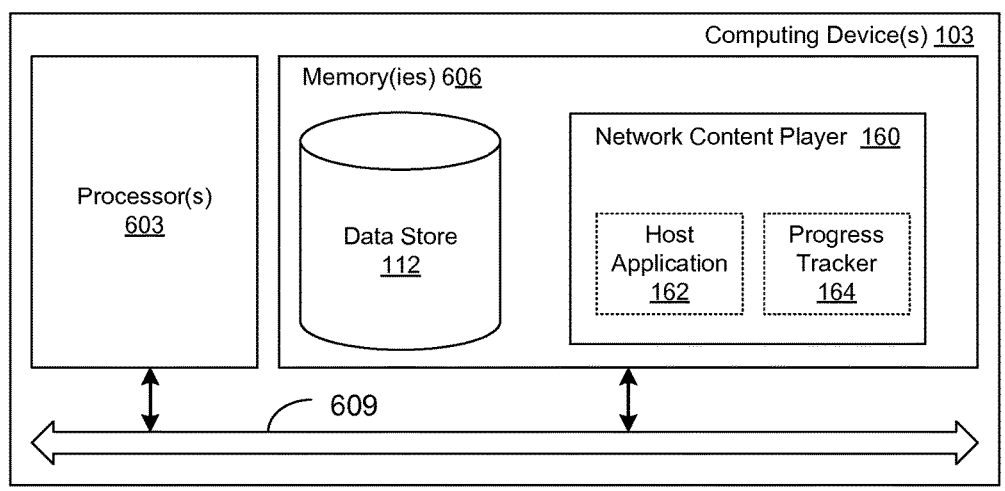
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are a network content player 160 and potentially other applications. The network content player, for example, may include application components such as a host application 162, progress tracker 164, or any other component or module. Also stored in the memory 606 may be a data store 112 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the network content player 160 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5A and 5B show the functionality and operation of an implementation of portions of the network content player 160. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 5A and 5B show a specific order of execution, it is understood that the order of execution may differ from that which is depicted. For example, the order of execution of two or more blocks may be scrambled relative to the order shown. Also, two or more blocks shown in succession in FIGS. 5A and 5B may be executed concurrently or with partial concurrence. Further, in some embodiments, one or more of the blocks shown in FIGS. 5A and 5B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network content player 160, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one computing device, directs the at least one computing device to perform a method, comprising:
  generating, by the at least one computing device, a universal resource locator for facilitating access to a plurality of sequential items in a series of multimedia items;
  associating, by the at least one computing device, the universal resource locator with a pointer to the plurality of sequential items in the series of multimedia items;
  encoding, by the at least one computing device, a user interface to receive an indication of a progress of a presentation of the series of multimedia items in response to a first user input received from a client device;
  storing, by the at least one computing device, the progress of the presentation in a data store, wherein the progress of the presentation comprises at least a time marker and an episode identifier;
  after associating the universal resource locator with the pointer and storing the progress of the presentation, linking, by the at least one computing device, the pointer to the series of multimedia items based at least in part on the time marker and the episode identifier stored in the data store;
  resuming, by the at least one computing device, playback of the series of multimedia items through a link to a last point of the progress of the presentation according to the pointer in response to a utilization of the universal resource locator; and
  resetting, by the at least one computing device, the progress of the presentation in response to a second user input received from the client device.

2. The non-transitory computer-readable medium of claim 1, wherein the series of multimedia items is a video series comprising a plurality of sequential episodes.

3. The non-transitory computer-readable medium of claim 1, wherein:
  the universal resource locator comprises a plurality of different universal resource locators; and
  the method further comprises associating, by the at least one computing device, individual ones of the plurality of different universal resource locators with the pointer.

4. A system, comprising:
  a memory configured to store computer-readable instructions; and
  at least one computing device coupled to the memory and configured, through execution of the computer-readable instructions, to:
    maintain a network address identifier to facilitate access to a network content;
    associate the network address identifier with a pointer to the network content;
    store a progress of a presentation of the network content in a data store;
    after the network address identifier is associated with the pointer and the progress of the presentation is stored in the data store, link the pointer to the network content based at least in part on the progress of the presentation stored in the data store; and
    resume playback of the network content through a link to the progress of the presentation according to the pointer in response to a utilization of the network address identifier.

5. The system of claim 4, wherein:
  the network address identifier comprises a plurality of different network address identifiers; and
  the at least one computing device is further configured to associate individual ones of the plurality of different network address identifiers with the pointer.

6. The system of claim 4, wherein the at least one computing device is further configured to store the progress of the presentation in response to a user input received from a client device.

7. The system of claim 4, wherein the network content comprises one or more of a video episode, an audio track, an eBook, or an audio book.

8. The system of claim 4, wherein the network content comprises a plurality of media items that make up a sequentially ordered series of media items.

9. The system of claim 8, wherein the at least one computing device is further configured to store a progress of a presentation of the sequentially ordered series of media items.

10. The system of claim 9, wherein the at least one computing device is further configured to resume playback of the sequentially ordered series of media items at a last point of the progress of the presentation in response to utilization of the network address identifier.

11. The system of claim 4, wherein:
  the progress of the presentation of the network content comprises a time marker and an episode identifier; and
  the at least one computing device is further configured to link the pointer to the network address identifier based at least in part on the time marker and the episode identifier.

12. A method, comprising:
  storing, in a memory accessible to at least one computing device, at least one universal resource locator for facilitating access to multimedia network content;
  associating, by the at least one computing device, the at least one universal resource locator with a pointer to the multimedia network content;
  storing, in the memory, a time marker associated with a progress of a presentation of the multimedia network content; and
  after associating the at least one universal resource locator with the pointer and storing the time marker, linking, by the at least one computing device, the pointer to the multimedia network content based at least in part on the time marker; and
  resuming playback of the multimedia network content through a link to the progress of the presentation according to the pointer in response to a utilization of the at least one universal resource locator.

13. The method of claim 12, further comprising storing, in the memory, an episode identifier associated with the progress of the presentation of the multimedia network content.

14. The method of claim 13, further comprising linking, by the at least one computing device, the pointer to the multimedia network content based at least in part on the time marker and the episode identifier.

15. The method of claim 12, wherein the multimedia network content includes a plurality of multimedia items in a series of sequentially ordered episodes.

16. The method of claim 15, wherein:
the at least one universal resource locator comprises a plurality of different universal resource locators; and
the method further comprises associating, by the at least one computing device, individual ones of the plurality of different universal resource locators with the pointer.

17. The method of claim 12, further comprising encoding for display a user interface to facilitate receipt of an indication to store the time marker for a particular point in time.

18. The method of claim 12, further comprising tracking, by the at least one computing device, the progress of the presentation of the multimedia network content.

19. The method of claim 12, wherein the at least one universal resource locator comprises at least one canonical universal resource locator.

20. The method of claim 12, wherein the linking further comprises updating, in the memory, the pointer to reference the progress of the presentation of the multimedia network content at a last point of the progress of the presentation.

* * * * *